United States Patent
Thomas et al.

(10) Patent No.: US 6,599,057 B2
(45) Date of Patent: Jul. 29, 2003

(54) COLD IN-PLACE RECYCLING OF BITUMINOUS MATERIAL

(75) Inventors: Todd Thomas, Bel Aire, KS (US); Arlis Kadrmas, Wichita, KS (US)

(73) Assignee: KMC Enterprises, Inc., Wichita, KS (US)

(*) Notice: Subject to any disclaimer, the term of this patent is extended or adjusted under 35 U.S.C. 154(b) by 40 days.

(21) Appl. No.: 09/881,491

(22) Filed: Jun. 14, 2001

(65) Prior Publication Data

US 2003/0113163 A1 Jun. 19, 2003

(51) Int. Cl.$^7$ ................................................. E01C 9/00
(52) U.S. Cl. ........................................... 404/72; 404/75
(58) Field of Search ............................. 404/71, 72, 75, 404/90, 91; 106/DIG. 7, 273.1, 277, 278; 73/146, 863, 864

(56) References Cited

U.S. PATENT DOCUMENTS

| | | | | |
|---|---|---|---|---|
| 4,373,961 A | * | 2/1983 | Stone | 106/281.1 |
| 4,549,834 A | * | 10/1985 | Allen | 106/278 |
| 4,944,631 A | * | 7/1990 | Egli | 404/111 |
| 4,946,307 A | * | 8/1990 | Jakob | 404/90 |
| 4,974,993 A | * | 12/1990 | Crabbi | 404/75 |
| 5,114,483 A | * | 5/1992 | Graf | 106/277 |
| 5,618,862 A | * | 4/1997 | Germanaud et al. | 524/59 |
| 5,741,085 A | * | 4/1998 | Wirtgen | 404/75 |
| 5,766,333 A | * | 6/1998 | Lukens | 106/280 |
| 6,089,783 A | * | 7/2000 | Goacolou | 404/27 |
| 6,139,612 A | * | 10/2000 | Kitagawa et al. | 106/280 |
| 6,186,700 B1 | * | 2/2001 | Omann | 404/79 |
| 6,380,284 B1 | * | 4/2002 | Lopez | 524/59 |

FOREIGN PATENT DOCUMENTS

| | | | | |
|---|---|---|---|---|
| EP | 0274920 | * | 11/1987 | C08L/95/00 |
| EP | 0324491 A1 | * | 7/1989 | E01C/23/06 |
| WO | WO 98/54263 | * | 12/1998 | C08L/95/00 |

* cited by examiner

Primary Examiner—Robert E. Pezzuto
Assistant Examiner—Alexandra K. Pechhold
(74) Attorney, Agent, or Firm—Stinson Morrison Hecker LLP

(57) ABSTRACT

A method of reconstructing includes taking representative cores of the road, analyzing the cores, selecting a substantially solvent-free emulsion based on climate history, mixing the emulsion and reclaimed asphalt pavement particles to form an asphalt emulsion mix, testing the asphalt emulsion mix for performance using a raveling test, a thermal cracking prediction test by an indirect tensile testing, a moisture susceptibility test utilizing vacuum saturation, and a dry Marshall stability test. It also includes designing a CIR layer based on this test data. It further includes grinding off a layer of the existing asphalt road leaving at least about an inch, adding an emulsion to the reclaimed asphalt pavement particles, applying the designed cold in-place recycling layer to the road, and compacting it.

25 Claims, 9 Drawing Sheets

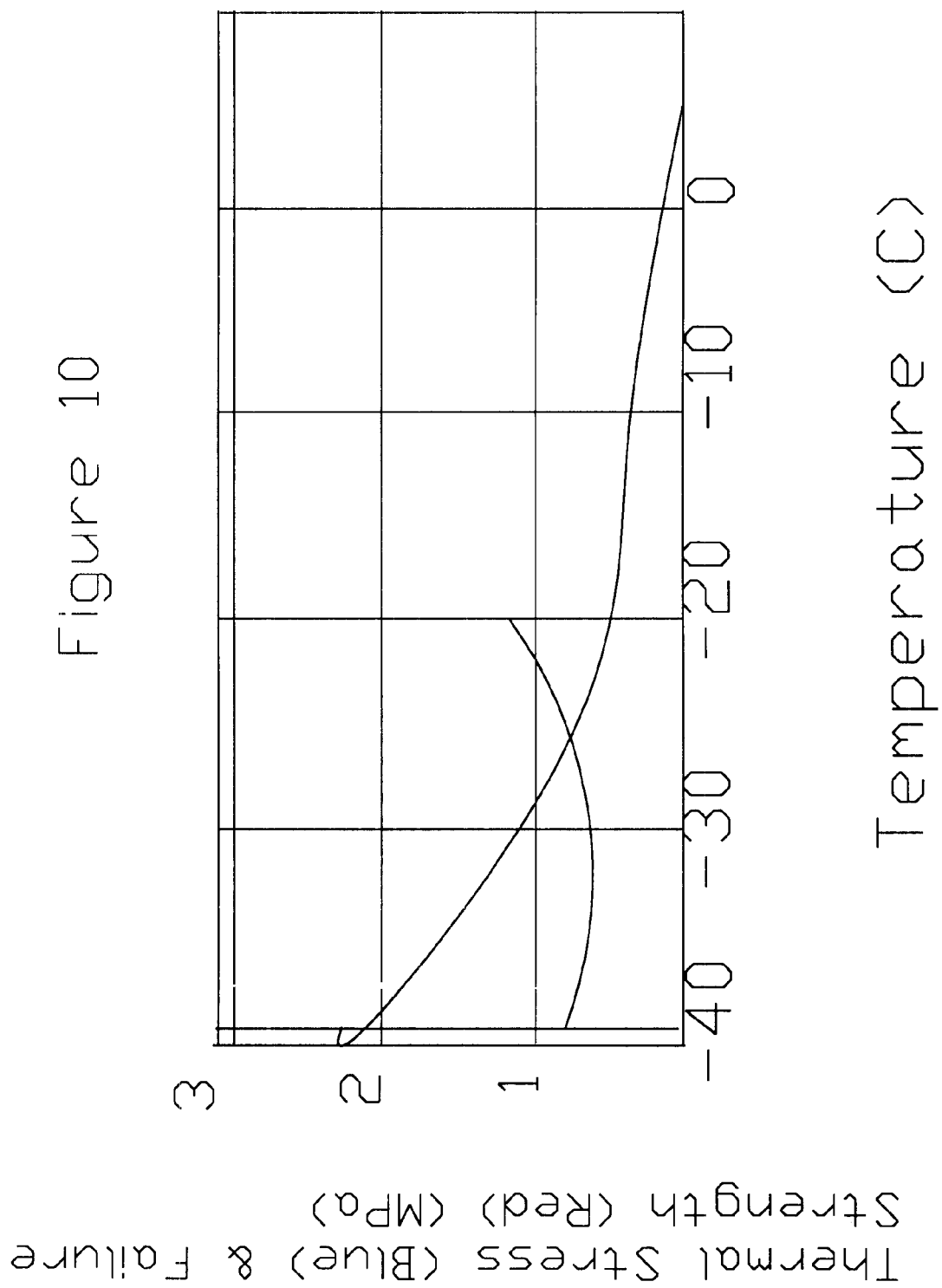

COLD IN-PLACE RECYCLING OF BITUMINOUS MATERIAL

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

The present invention relates to reconstructing and paving roads. More specifically, the present invention is a cold in-place recycling (CIR) method for designing an asphalt emulsion mix and building a road.

Traditionally, when roads are rehabilitated, material is milled and removed. Then, hot mix is brought to the construction site and placed on the milled area. One disadvantage with such a process is that it is time consuming because it requires two operations. In one operation, the road is milled up, and the material is removed. Then, in the second operation, the hot mix asphalt is transported to the site and placed on the milled pavement. Another disadvantage with such a process is that the milled material is often not reused.

More recently, roads that are in fair or poor condition have been replaced or rehabilitated using cold in-place recycling (CIR) of the bituminous material that makes up the road. However, these CIR processes lack thorough designs and thus have consistency problems, such as inconsistency in emulsion content. Many times they do not provide the desired performance. Still further, roads made with conventional CIR processes are unreliable, and many times this leads to raveling, pot holes, rutting, disintegration problems, and cracks.

In order to overcome these disadvantages, a process that provides better road performance while using recycled materials is needed.

SUMMARY OF THE INVENTION

It is an object of the present invention to provide a cold in-place recycling method that has improved performance and more consistency so that severely distressed pavement can be rehabilitated.

According to the present invention, the foregoing and other objects are achieved by a method of reconstructing a road. This method includes taking representative cores of the road, analyzing the cores, crushing the cores, selecting a solvent-free emulsion based on climate history, mixing the emulsion and reclaimed asphalt pavement particles (RAP) to form an asphalt emulsion mix, and testing the asphalt emulsion mix for performance using a raveling test, a thermal cracking prediction test by indirect tensile testing, a moisture susceptibility test incorporating vacuum saturation, and a dry Marshall stability test. It also includes designing a CIR layer based on this test data. It further includes grinding off a layer of the existing asphalt leaving at least about an inch of pavement, adding an emulsion to the reclaimed asphalt pavement particles, applying the designed cold in-place recycled layer to the road, and compacting it.

Additional objects, advantages, and novel features of the invention will be set forth in the description that follows and in part will become apparent to those skilled in the art upon examination of the following, or may be learned by practice of the invention.

BRIEF DESCRIPTION OF THE FIGURES

In the accompanying figures, which form a part of the specification and are to be read in conjunction therewith:

FIG. 10 is a graph showing indirect tensile strength of specimens made in accordance with the present invention in Example 4 with 3% by weight emulsion.

DETAILED DESCRIPTION OF THE PREFERRED EMBODIMENT

Figure 1:
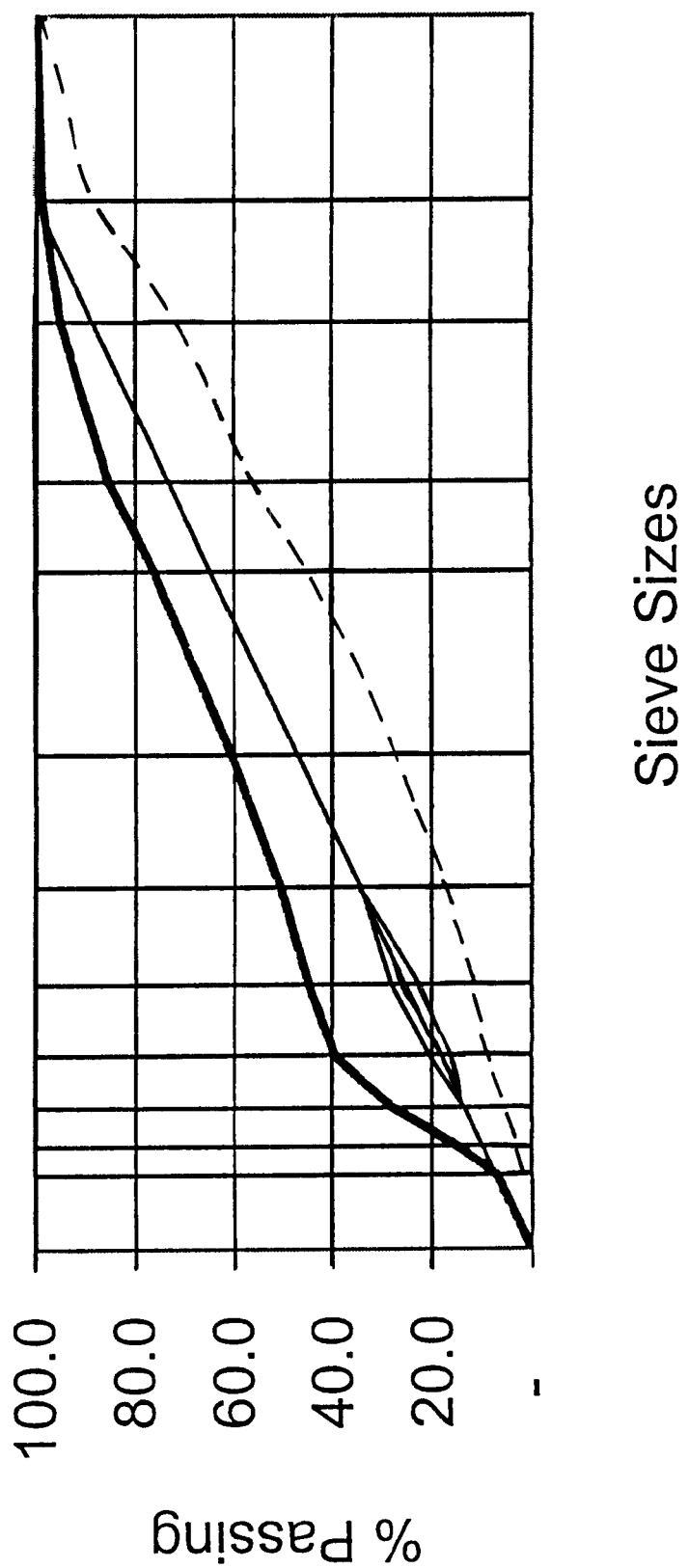
FIG. 1 is a graph showing sieve analysis of the RAP and rock used in the CIR process of the present invention as it was performed in Example 1.

The cold in-place recycling process of the present invention can be considered when a pavement surface is at the end of its serviceable life. When pavement exhibits alligator (fatigue) cracking, thermal cracks, raveling and potholes, ruts, flushing or bleeding, low skid resistance, or a rough texture, the CIR process of the present invention may be desirable. It may be especially desirable where there are low clearances on bridges and overpasses or where curb heights are a concern. It may be used on rural roads, intrastate highways and interstate highways. It is especially useful on distressed pavement that is about 12–25 years old. The particular design of the CIR material should be based on the process and conditions outlined below, which are part of the present invention. The present invention addresses problems that occur with conventional CIR processes such as raveling, thermal cracking, slow curing times, and unreliable performance. The CIR method of the present invention provides partial depth rehabilitation of severely distressed pavement that has a structurally sound base and good drainage.

First, the road is evaluated to see if it is fit for the process of the present invention. The aged pavement must be thick enough to leave at least about an inch of pavement after preferably two to five inches of it is milled. Also, the road must have a structurally sound base, including a structurally sound subgrade layer. Sample cores are taken to determine variations in pavement, the desired gradation of the reclaimed asphalt pavement particles (RAP) and emulsion amount so as to create a mix design. The emulsion formulation is selected based on climate history and application temperature. The top portion of the aged pavement is ground off as recommended by the mix design leaving at least about an inch of pavement. Only the pavement is removed. No rock, gravel or dirt beneath the pavement is removed. The RAP is then combined with the selected emulsion to form the CIR material of the invented method. This CIR material is then placed on the road and compacted.

After the road is evaluated, the CIR process of the present invention involves making a preconstruction mix design using materials obtained directly from the project site. Representative cores are obtained from the areas of pavement to be recycled to evaluate the existing pavement. Preferably, the cores taken are distributed throughout the project length, including where visual differences in the pavement are noticed. Cores shall be pulverized, crushed, and screened in the laboratory to form RAP. The RAP is considered black rock or aggregate for purposes of further mix design. If the cores show significant differences in various areas, such as different types or thickness of layers, then separate mix designs shall be performed for each of these pavement segments. The recycled asphalt pavement millings shall be blended to the following gradation criteria for fine, medium and coarse mix designs prior to the addition of asphalt emulsion.

TABLE 1

| Sieve size inches | Fine % passing thru | Medium % passing thru | Coarse % passing thru |
|---|---|---|---|
| 1.25" | 100 | 100 | 100 |
| 0.187" (No. 4) | 55–65 | 40–50 | 28–38 |
| 0.0234" (No. 30) | 20–25 | 7–12 | 4–10 |
| 0.0020" (No. 200) | >1.0 | >0.5 | >0.1 |

The mix design shall be performed using these crushed millings. Mix design includes defining gradation and selecting the amount and composition of the emulsion. Gradation of the millings after crushing shall be determined by washing the millings and putting them through various sieves. Particle size distribution of the fine and coarse aggregates shall be determined by sieving through a series of sieves of progressively smaller openings. Preferably, the Standard Test Methods for Materials Finer Than 75 $\mu$m (No. 200) Sieve in Mineral Aggregates by Washing (ASTM C117) and Sieve Analysis of Fine and Coarse Aggregates (dried at no greater than 40° C.) (ASTM C136), are followed.

Samples shall be prepared with a sample splitter to maintain uniformity of material. An alternative method is to dry, screen and recombine millings in the laboratory to achieve a targeted gradation. Suggested sieves are ½ inch, ⅜ inch, No. 4 (0.187 inch), No. 8 (0.093 inch), and No. 30 (0.0234 inch). Oversized RAP particles are removed with a 1 inch screen when using 100 mm diameter compaction molds.

Next, the theoretical maximum specific gravity and density of the RAP samples are determined from mass and volume measurements. Preferably, the Standard Test Method for Theoretical Maximum Specific Gravity and Density of Bituminous Paving Mixtures (ASTM D2041) is used to determine the size for the Rice specific gravity test. Four specimens per emulsion content are desired to test for long term stability and moisture testing. Two specimens are required for the Rice specific gravity test. The RAP samples are tested for theoretical maximum specific gravity at the highest emulsion content in the design and then back calculated for the lower emulsion contents.

An asphalt emulsion will then be incorporated into the pulverized material. The type or formulation of asphalt emulsion used shall be determined by the climate in which the emulsion is used and the temperature when it is placed. It may be chosen, for example, to improve coating of the RAP or to adjust breaking properties. Preferably, the mixture cold temperature cracking specification shall be chosen using data from FHWA LTPP Bind™ software (Version 2.1) by inputting data from the weather station closest to the project. The required temperature for the mix design specification is the coldest temperature at the top of the CIR layer in the pavement structure, using 98% reliability.

The asphalt emulsion is a blend of asphalt, water, emulsifier, and possibly additives. It is liquid at ambient temperature. The specific formulation of the emulsion can vary depending upon the properties to be achieved. For instance, it can be formulated to set up quickly. It also can be formulated to improve the coating of the bituminous material, to result in less cracking of the roadway or to improve the strength of the roadway. The type of asphalt emulsion used shall be determined by the mixture design, discussed infra.

Preferably, the emulsion includes about 0.5 to 10% by weight emulsifier, about 60 to 65% by weight asphalt solids, water, and optionally certain additives. Preferably, the emulsion is substantially solventless and water-based. The additives may be about 0.5 to 10% by weight of the emulsion and may include elastomers, plastomers, other adhesion agents, and petroleum fractions. Preferably, it includes a maximum of about 0.5% by weight fuel oil. Depending on which additives are used, these additives can be added to the asphalt solids or to the emulsion to make modified asphalts, including polymer modified asphalt. The emulsifier can be anionic, nonionic, amphoteric, or cationic. Most preferably, the emulsifier is cationic.

The asphalt emulsion shall be at a temperature no greater than about 120° F. during application. Usually, it is between about 80° and 120° F. during application. The emulsion quality assurance testing shall meet the following requirements:

TABLE 2

| Test | | Minimum | Maximum |
|---|---|---|---|
| Residue from distillation, % by weight | ASTM D244[1] | 64.0 | 66.0 |
| Oil distillate by distillation, % by weight | ASTM D244[1] | | 0.5 |
| Sieve Test, % by weight | ASTM D244[1] | | 0.1 |
| Penetration (TBD[2]), 25° C., dmm | ASTM D5 | −25% | '+25% |

[1]Modified by conducting it at a temperature of 177° C. and having a 20 minute hold. This is the preferred procedure. The Standard Test Methods and Practices for Emulsified Asphalts (ASTM D244) vacuum distillation procedure determines residue and oil distillate in asphalt emulsions. It may be substituted once the maximum oil distillate is satisfied.
[2]TBD - to be determined by the CIR design prior to emulsion manufacture for project.
Penetration range will be determined on the design requirements for the project.
ASTM D5 is the preferred procedure for determining the penetration of semi-solid and solid bituminous material. This penetration test is used to measure harder or softer consistencies of the asphalt binder.

The emulsion is added to the reclaimed asphalt pavement particles (RAP). The emulsion should be present in a sufficient quantity that the mixture is not too dry so as to cause raveling but not in such a high quantity that the mixture easily ruts. The emulsion is usually about 1.5 to 4.5% by weight of the mixture. Preferably, it is about 2.4 to 4.0% by weight of the mixture. Most preferably, it is 2.8 to 3.3% by weight of the mixture. The recommended emulsion contents for design mix formulations are about 1.5%, 2.0%, 2.5%, 3.0%, 3.5%, 4.0%, and 4.5% by weight emulsion. Preferably, three emulsion contents are chosen that bracket the estimated recommended emulsion content. Prior to the addition of emulsion, the amount of moisture that is expected to be added by the milling head, typically about 1.5 to 2.5% by weight, is added. If any additives are in the mixture, these additives are introduced in a similar manner to how they will be added during field production.

The reclaimed asphalt pavement particles (RAP) from milling are first thoroughly mixed with water, and then they are mixed with the emulsion. Mixing shall occur at approximately ambient temperature. The mixing time with the emulsion should not exceed about 60 seconds.

The specimens are compacted within about 15 minutes of being mixed. Preferably, the specimens shall be compacted immediately after mixing. Paper disks are placed on the top and bottom of each specimen before compaction. Preferably, specimens shall be compacted with a Superpave™ gyratory compactor (SGC) in a 100 mm mold at 1.25° angle, 600 kPa ram pressure, and 30 gyrations. The mold shall not be heated.

The specimens are then extruded from the molds immediately after compaction, and the paper disks are carefully removed. The specimens are placed in a 60° C. forced draft oven with ventilation on its sides and top, typically for 48 hours. Each specimen is placed in a small container to account for material loss from the specimens.

Four performance tests are conducted on these specimens. They are a dry Marshall stability test, a moisture susceptibility test using vacuum saturation, a raveling test, and a thermal cracking prediction test by indirect tensile testing (IDT). These tests determine the performance of the specimens. The indirect tensile test predicts thermal cracking, and the dry Marshall stability test measures strength. The raveling test measures raveling resistance, and the moisture susceptibility test measures the specimens ability to withstand moisture damage. In order for the formulated mix design to be used, it must meet the criteria set forth below in Table 3 for all of these tests.

TABLE 3

100 mm specimens shall be prepared in a Superpave ™ Gyratory compactor. The mixture should meet the following criteria at the selected design asphalt emulsion content:

| Property | Criteria | Purpose |
|---|---|---|
| Compaction effort, Superpave ™ Gyratory Compactor | 1.25 angle, 600 kPa stress, 30 gyrations | Density Indicator |
| Density, ASTM D 2726 or equivalent | Report | Compaction Indicator |
| Gradation for Design Millings, ASTM C117 | Report | |
| Marshall stability*, ASTM D 1559-89 Part 5, 40° C. | 1,500 lb min. | Stability Indicator |
| Retained stability based on cured stability** | 70% min. | Ability to withstand moisture damage |
| Indirect Tensile Test, AASHTO TP9-96, Modified as discussed infra | LTPPBind ™ temperature for climate and depth | Cracking (Thermal) |
| Raveling Test, Method Attached, Ambient temperature | 2% max. | Raveling Resistance |

*Cured stability tested on compacted specimens after 60° C. (140° F.) curing to constant weight.
**Vacuum saturation of 55 to 75%, water bath 25° C. 23 hours, last hour of 40° C. water bath For the Marshall stability test, specimens are dried to constant weight. Compacted specimens are cured to constant weight but for no more than 48 hours and no less than about 16 hours. Constant weight is defined as about 0.05% or less change in weight in 2 hours. After curing, specimens are cooled at ambient temperature a minimum of about 12 hours and a maximum of about 24 hours.

The bulk specific gravity (density) of each compacted (cured and cooled) specimen is determined. The mass of the specimen in water is recorded after one minute submersion. Specimen heights are also determined.

The Rice (maximum theoretical) specific gravity is determined. Preferably, it is determined following the Standard Test Method for Theoretical Maximum Specific Gravity and Density of Bituminous Paving Mixtures (ASTM D2041) including the dry-back procedure. The agglomerates that will not easily reduce with a flexible spatula should not be broken. It is normally necessary to perform a supplemental dry-back procedure to adjust for uncoated particles. The amount of air voids are determined for each specimen having a different emulsion content.

Corrected Marshall stability is determined by measuring the paving mixture's resistance to plastic flow. Preferably, it is determined using the Standard Test Method for Resistance to Plastic Flow of Bituminous Mixtures Using Marshall Apparatus (ASTM D1559-89) at about 40° C. after 2 hour temperature conditioning in a forced draft oven.

The moisture susceptibility vacuum saturation test measures retained strength in the presence of moisture. For the moisture susceptibility test, the same conditioning and volumetric measurements are performed on moisture-conditioned specimens as performed on the specimens used for the dry Marshall stability test. These specimens are vacuum saturated to about 55 to 75% of the volume of voids followed by soaking them in an about 25° C. water bath for about 23 hours, followed by about a one hour soak at about 40° C. The corrected Marshall stability is then determined. The average moisture conditioned specimen strength divided by the average dry specimen strength is referred to as retained stability. This is an indicator of stripping and strength loss, which leads to rutting and the formation of potholes. The retained stability must be greater or equal to about 70%.

After the dry Marshall stability test and the moisture susceptibility test are performed, an indirect tensile test (IDT) is performed on the mixture at the designed emulsion quantity. This IDT performance test estimates the cold temperature cracking initiation of the mixture. It predicts the coldest temperature that the mixture can withstand and avoid cracking at the top of the CIR layer. Preferably, the indirect tensile test is performed according to AASHTO TP9-96, which is the Standard Test Method for Determining the Creep Compliance and Strength of Hot Mix Asphalt (HMA) Using the Indirect Tensile Test Device, with the following exceptions:

Specimens shall be about 150 mm in diameter and at least about 115 mm in height and compacted to air voids ±1% of the designed air voids at the designed emulsion content. Test specimens shall be cured at 60° C. for no less than about 48 hours and no more than about 72 hours. The specimen mass should be checked every 2 hours after the 48-hour cure to determine if there has been no more than about a 0.05% change in mass in 2 hours. After curing, two specimens shall be cut from each compacted specimen to about 50 mm in height. A bulk specific gravity test is then performed after cutting.

Preferably, two specimens are the minimum required at each of three temperatures. Three temperatures at about 10° C. intervals that bracket the required specification temperatures are selected. For example, if the required specification temperature is −25 ° C., then testing temperatures of −20° C. and −30° C., and −10° C. or −40° C. should be selected. The tensile strength test shall be carried out on each specimen directly after the tensile creep test at the same temperature as the creep test. The environmental chamber must be capable of reaching temperatures at least as low as about −40° C.

The critical cracking temperature is defined as the plotted intersection of the calculated pavement thermal stress curve (derived from the creep data) and the tensile strength line (the line connecting the results of the average tensile strength at the three temperatures). To pass this test, the predicted thermal cracking temperature by IDT should meet the requirements defined by the LTPP Bind™ program, at 98% reliability, for the coldest temperature at the top of the CIR layer in the climate in which the project is performed.

After the Marshall stability and moisture susceptibility tests are performed, a raveling test is also performed on the specimens at the designed emulsion quantity. The raveling test is an indicator of raveling that may occur before the material is fully cured due to traffic driving on the material. Four hours after the sample is compacted, it is tested for about 15 minutes. To pass this test, there must be a mass loss of less than about 2% by weight.

Preferably, the apparatus used for conducting the raveling test is an A-120 Hobart mixer that is modified to allow the sample and an abrasion head (including hose) to fit properly for abrasion. Preferably, the Test Method for Wet Track Abrasion of Slurry Surfaces (ISSA TB-100) is followed for conducting the raveling test, and the rotation speed for the raveling test is not modified. The ring weight is removed from the abrasion head for the raveling test. The weight of the abrasion head and hose in contact with the specimen should be about 600±15 g. The prepared sample must be able to be secured under the abrasion head and centered for accurate results, allowing for free vertical movement of the abrasion head. The device used for securing and centering the sample must allow a minimum of about 1 cm of the sample to be available for abrasion.

The raveling test is conducted as follows. Two recycled asphalt samples from the medium gradation or the field sample of a quantity of about 2700 g are split out from the specimens. The 2700 g is an approximate weight to give 70±5 mm of height after compaction. The recycled asphalt sample (2700 g) should be placed in a container of adequate size for mixing. Field or design moisture contents should be added to each of the recycled asphalt samples and mixed for about 60 seconds. The designed emulsion content shall be added to each of the recycled asphalt samples and mixed for about 60 seconds. The samples shall be placed immediately into a 150 mm gyratory compaction mold and compacted to 20 gyrations. If the sample height is not 70±5 mm, the recycled asphalt weight should be adjusted. After compaction, the samples shall be removed from the compaction mold and placed on a flat pan to cure at ambient lab temperature (about 65–75° F.) for about 4 hours ±5 minutes. The specimens shall be weighed after the curing, just prior to testing.

The specimens shall be placed on the raveling test apparatus. Care should be taken that the specimen is centered and well supported. The area of the hose in contact with the specimen should not have been previously used. It is allowable to rotate the hose to an unworn section for testing. The abrasion head (with hose) shall be free to float over the sample and move vertically downward a minimum of about 5 mm if abrasion allows. The samples shall be abraded for about 15 minutes and immediately weighed.

The percent raveling loss shall be determined as follows: ((Wt. Prior to test−Wt. After. abrasion)/Wt. Prior to tZest)*100. The average of the two specimens shall be reported as the percent raveling loss. There should not be a difference of greater than about 0.5% raveling loss between the two test specimens for proper precision. A difference of greater than about 0.5% will require the test to be repeated. If both of the samples have a raveling loss of greater than about 10% the numbers shall be averaged, and the precision rule will be waived.

If necessary, additives may be used to modify the mix design to meet the requirements in Table 3. Additives, such as lime, additional aggregate, polymers, or combinations thereof may be added to the mix to meet Table 3 requirements. If available, additional crushed RAP material may be added if it meets the requirements in Table 4. The crushed RAP shall be substantially free from vegetation and all other deleterious materials, including silt and clay balls. The crushed RAP shall not exceed the maximum size requirement discussed above, and when blended with the design millings it shall produce a product that meets the specifications given in Table 3.

TABLE 4

Additional Crushed RAP

| Tests | Method | Limit |
|---|---|---|
| Deleterious Materials: Clay Lumps and Friable Particles in Aggregate, % max | ASTM C 142 or AASHTO T112 | 0.2 recommended |
| Maximum size, 100% Passing, Sieve Size | ASTM C 136 or AASHTO T 27 | 1.25 inch |

If additional aggregate is required, it shall meet the requirements in Table 5, and it shall be graded to produce a product which meets the specifications given in Table 3.

TABLE 5

Additional Aggregate

| Tests | Method | Limit |
|---|---|---|
| Los Angeles abrasion value, % loss | AASHTO T 96 | 40 max for Surface mix 50 max for Base mix |
| Sand Equivalent, % | ASTM D-2419 | 60 minimum |
| Maximum size, 100% Passing, Sieve Size | ASTM C 136 or AASHTO T27 | 1.25 inch |
| Water absorption % | AASHTO T85 | 5 max. |

If the pavement significantly varies at different places in the road, then one should attempt to develop mix designs that meet the criteria of Table 3 for each of the differing segments of road. For instance, some areas of the road may require higher emulsion contents than others.

Before placing the CIR material on the road, grass and other vegetation shall be removed from the edge of the existing pavement to prevent contamination of the pulverized bituminous material during the milling operation.

The pavement surface temperature may be as high as about 160° F. during construction without creating any problems. The existing pavement shall be milled to the desired depth and width leaving at least about one inch of pavement on the road and not removing any gravel, dirt or stone. Usually, between about 2 and 5 inches of pavement are removed when the road is milled. Samples of pulverized bituminous material shall be obtained about each ½ mile before emulsion addition and screened using a 1.25 in. sieve (or smaller sieve if required) to determine if the pulverized material meets the maximum particle size requirement of the design mix. A sample or samples taken at the beginning of the project will determine which design gradation the pulverized material is closest to in order to define emulsion content.

A self-propelled cold milling machine is used to pulverize the existing bituminous material in a single pass to the desired depth, and preferably, it is capable of milling to a width of up to about 12.5 feet. Preferably, the machine shall have automatic depth controls to maintain the cutting depth to within ±¼ in. of the desired depth and shall have a positive means for controlling cross slope elevations.

A material sizing unit having screening and crushing capabilities is used to reduce the pulverized bituminous material to the desired size prior to mixing it with asphalt emulsion. Preferably, the screening and crushing unit shall have a closed circuit system capable of continuously returning oversized material to the crusher. All of the reclaimed asphalt pavement shall be processed to meet the maximum size requirements.

A mixing unit equipped with a belt scale for the continuous weighing of the pulverized and sized bituminous material is used. Preferably, it is coupled with a computer controlled liquid metering device. Preferably, the mixing unit shall be an on-board completely self-contained pugmill. Preferably, the liquid metering device shall be capable of automatically adjusting the flow of asphalt emulsion to compensate for any variation in the weight of pulverized material coming into the mixer. Preferably, there is two-way communication between the paver and the pugmill unit to keep them near to one another. Preferably, they are within about 50 yards of each other.

The asphalt emulsion and water shall be incorporated into the pulverized bituminous material at the initial rate determined by the mix design(s). The total water content may include the amount added at the milling head and may also include additional water from the mixing unit, if available. Adjustments in the rate of asphalt emulsion and water are made as necessary based on the coating and breaking properties. The RAP should be more fully coated than conventional processes. Sampling and mix design may determine that different levels of asphalt emulsion are needed at various portions of the road.

The CIR mixture exits the pugmill and is laid on the road to form a windrow. A pick-up machine may be pushed by the paver and used for transferring the recycled material from the windrow to the receiving hopper of the bituminous paver. The pick-up machine shall be capable of removing the entire windrow down to the remaining underlying material. The pick-up machine should be within about 150 feet of the mixing unit. The recycled material shall be spread in one continuous pass, without segregation.

The above-described equipment (mixing unit, pick-up machine, and paver) can be combined as a self-propelled paver with on-board mixing unit and emulsion tank, wherein millings are added directly to the hopper.

The cold recycled material cross slope shall be checked regularly during spreading using a level. The smoothness shall not vary more than about ¼ inches from the lower edge of a 10-foot straight edge placed on the surface parallel and transversely to the centerline after rolling is completed.

Recycling shall be conducted in a manner that does not disturb the underlying material in the existing roadway. The milling operation shall be conducted so that the amount of fines occurring along the vertical faces of the cut will not prevent bonding of the cold recycled materials. The pulverized bituminous material shall be processed by screening and crushing to the required gradation. When a paving fabric is encountered during the CIR operation, necessary adjustments shall be made in equipment or operations so that at least about ninety percent of the shredded fabric in the recycled material is no more than about 5 square inches. Additionally, no fabric piece shall have any dimension exceeding a length of about 4 inches. These changes may include, but not be limited to, adjusting the milling rate and adding or removing screens in order to obtain a desired recycled material.

Another aspect of the present invention is on-site monitoring of the process. The nominal depth of milling shall be checked on both outside vertical faces of the cut about every ⅛ mile. The gradation of the RAP is also checked. If samples of the recycled asphalt pavement prior to emulsion addition are taken during operation of the equipment, they must be put into a sealed container so as not to allow any loss of moisture. Samples must be mixed with the field emulsion within 24 hours and tested according to the mix design so as to meet the specifications defined, as required in Table 3. In addition, if samples of blended mixture are tested, these samples must be compacted within 15 minutes of sampling and then testing according to the mix design specifications.

Wet density of the newly spread CIR layer shall be determined using a nuclear moisture-density gauge. It is determined to establish the roller pressure and patterns to achieve the required density. Preferably, using a backscatter method, the Standard Test Method for Density of Bituminous Concrete in Place by Nuclear Methods (ASTM D2950) is followed for determining wet density. A rolling pattern will be established such that a maximum density is achieved with the rollers specified, based on relative nuclear density readings. However, care should be taken not to over-roll the mat based on visual observations of cracking. A new rolling pattern shall be established if the material being recycled changes. More than one roller pattern may be needed because of variance in the existing pavement, because of variations in aggregate, or because of variations in emulsion used.

Compacting of the recycled mix shall be completed using rollers. Preferably, the rollers have water and scraper systems for keeping the tires and rollers from sticking to the freshly applied CIR material. Rolling patterns shall be established to achieve a maximum density determined by nuclear density testing. Rolling shall be continued until no displacement is occurring or until the pneumatic roller(s) is (are) walking out of the mixture. Final rolling to eliminate pneumatic tire marks and to achieve density shall be done by double drum steel roller(s). The selected rolling pattern shall be followed unless changes in the recycled mix or placement conditions occur and a new rolling pattern is established at that time. Rolling or roller patterns shall change when major displacement and/or cracking of the recycled material is occurring. Rollers shall start compacting typically within 15 minutes of placement of the CIR layer. Preferably, rolling shall start no more than about 30 minutes behind the paver. Preferably, rolling shall be completed no more than one hour after milling is completed. When possible, rolling shall not be started or stopped on uncompacted material but with rolling patterns established so that rolling begins or ends on previously compacted material or the existing pavement.

After the completion of compaction of the recycled material, no traffic shall be permitted on the recycled material for at least about two hours. This may be reduced if sufficient cure is established for traffic that will not initiate raveling. After opening the roadway to traffic, the surface of the recycled pavement shall be maintained in a condition suitable for the safe movement of traffic. All loose particles that may develop on the pavement surface may be removed by power brooming.

The CIR material alone can support traffic prior to placement of a wearing surface thereon. Before placing a wearing surface or treatment on the CIR layer, the CIR layer shall be allowed to cure until its moisture is reduced to about 1.5% by weight or less. The wearing surface may be a cold, hot, or warm mix overlay, a sealcoat, a chip seal, a fog seal, or other surface treatment. Because the CIR surface can support traffic, the placement of a wearing surface can be delayed for several days if desired.

Preferably, the process of the present invention is performed at or above about 50° F. Preferably, no fog or rain is present. Preferably, there are no freezing temperatures within 48 hours after placement of any portion of the project.

The cold in-place recycling process of the present invention can remove thermal and reflective cracks, re-establish crowns, maintain clearances and curb heights, improve poor aggregate gradations, improve pavement quality with additives such as polymers, be higher quality than the original pavement, re-use existing materials, minimize the need for new materials, minimize lane closure time, and provide a new, smoother, black surface. The CIR method of the present invention improves raveling, isolated rutting, consistency in emulsion content, extended curing time, compaction problems, disintegration under traffic, moisture susceptibility, and crack resistance. It is more consistent, more predictable, has improved performance, better coating, longer durability, and higher film thickness than conventional CIR materials.

The CIR process of the present invention also creates more time for application in days per year because the process can be conducted at lower temperatures than conventional processes and in hours per day because the CIR material is compacted quicker than conventional processes. Some traffic can be supported by the new road within an hour, and large trucks can travel on the road within 2 hours of it being laid. When the CIR material created during the process of the present invention has reached the end of its life cycle, the recycled pavement can be recycled itself.

EXAMPLE 1

A cold in-place recycling (CIR) project was done on US-191 in Arizona, which is at an elevation of approximately 5610 feet, requiring about 245,040 square meters of CIR material. The terrain of the road was relatively flat. Normal high and low temperatures and normal precipitation for this area are shown in Table 6.

TABLE 6

|  | May | June | July | August | September |
|---|---|---|---|---|---|
| High temp., ° F. | 78 | 88 | 92 | 89 | 82 |
| Low temp., ° F. | 42 | 51 | 59 | 58 | 49 |
| Normal precipitation, in. | 0.53 | 0.27 | 1.31 | 1.37 | 0.93 |

Annual precipitation is 9.63 inches. It was in the mid-90s and sunny with low to moderate humidity when the project was performed.

The average daily traffic was 525 vehicles per day and 60 trucks per day. The annual cumulative 18 kip single axle equivalents (ESAL) was 13,000. The 20-year ESAL was 317,000. The average pavement thickness was approximately 5.5 inches of hot mix asphalt. The pavement was over 20 years old with several seal coats thereon.

The FHWA LTPPBind™ (Version 2.1) program recommended a binder to withstand 64° C. pavement temperatures for the surface mix (98% reliability). The 86% reliability value for the pavement surface temperature was 58° C.

Laboratory crushed CIR millings were obtained from this project and sent to a laboratory for evaluation. Mix designs were performed using the process of the present invention. Oven ignition was performed on the millings, and they were found to have 6.3% by weight asphalt. Parent rock consisted of rounded and crushed material. The gradation of the parent rock is shown in FIG. 1. This is a 0.45 power gradation graph. The x-axis represents several sieve sizes. From right to left, they are as follows: 1 inch, ¾ inch, ½ inch, ⅜ inch, No. 4, No. 8, No. 16, No. 30, No. 50, No. 100, and No. 200. The y-axis is the cumulative percent passing through the particular sieve. The straight unlabeled line is the maximum density line, a reference line. The separation in this line is the restricted zone.

Material above 1 inch in size was screened out before mixing. The mix design was performed with a Superpave™ gyratory compactor in a 100-mm mold to 30 gyrations. Short-term strength tests were performed comparing conventional CIR material and the CIR material obtained from the process of the present invention. Long-term cured specimens were tested for strength and retained strength after water saturation.

Specimens were made with 2.5% by weight emulsion and were cured after compaction at 30° C. and 50% humidity to simulate a worst-case scenario for field curing. After 4 hours and 24 hours, individual specimens were tested for indirect tensile strength.

After testing, the internal coating of the specimens created by the CIR process of the present invention was better than that of conventional CIR specimens. A 19% increase in strength of the CIR material of the process of the present invention over conventional CIR material was observed in the 4-hour specimens, and a 38% increase in strength of the CIR material of the method of the present invention was observed in the 24-hour specimens. Specimens made by the CIR process of the present invention had a greater increase in strength from 4 to 24 hours (49% vs. 32%).

Figure 2:
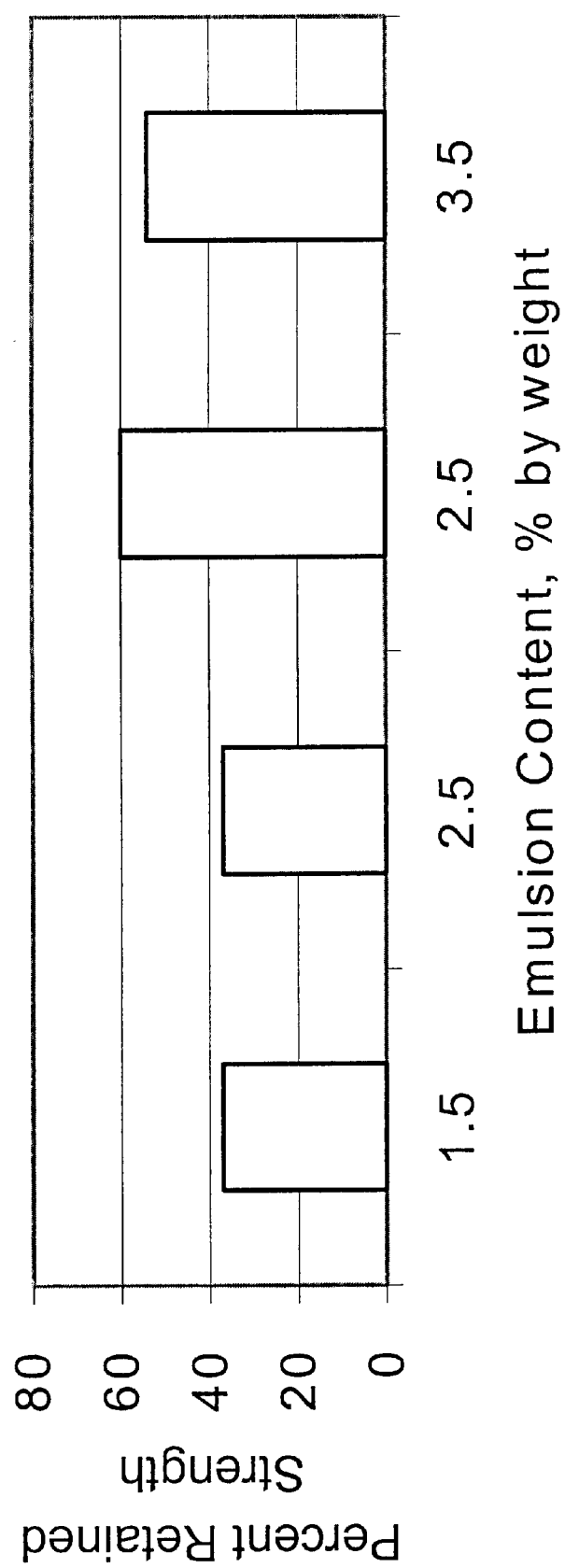
FIG. 2 is a graph showing retained strength data from the moisture sensitivity vacuum saturation test performed in Example 1 in accordance with the present invention.

Specimens were made with two different emulsion contents for both conventional CIR and the CIR material of the present invention and were cured after compaction to less than one percent moisture. After curing, half the specimens were tested dry and half the specimens were vacuum saturated with water and then soaked for 24 hours. The saturated data was for an indication of durability (long-term strength). All specimens were tested at 40° C. See Table 7 and FIG. 2.

TABLE 7

Marshall stability and retained stability

| | Emulsion content, % by weight | Air Voids, % | Saturation % | Stability, lb | Retained stability, lb | Percent Retained |
|---|---|---|---|---|---|---|
| Conv.CIR material | 1.5 | 13.5 | 77 | 1858 | 690 | 37 |
| | 2.5 | 12.4 | 74 | 2044 | 749 | 37 |
| CIR material obtained by the process of the present invention | 2.5 | 12.4 | 75 | 1727 | 1037 | 60 |
| | 3.5 | 11.0 | 77 | 1773 | 949 | 54 |

Cores were obtained and crushed, except cores 5 and 6. Oven ignition was performed on the millings, and the asphalt content of the combined crushed cores was 6.2% by weight. The asphalt content of cores 5 and 6 was 6.9% by weight.

Lab design called for 2.5% by weight emulsion content. The emulsion varied from 1.9% to 3.0% by weight. An emulsion content of 1.9% by weight was used on a section of pavement with high asphalt content (measured from the cores during design). This content still appeared to be low. The material in the field crushed finer than the original design. The emulsion content on the last 1,600 feet was increased to 3% by weight. There were no problems with this emulsion content.

The milling depth was three inches. The millings were blended with conventional CIR material in most of the project. The last 6.5 miles used the CIR material created from the process of the present invention. Cores were taken and a mix design was performed. Core data is shown in Table 8. Stations describing project events are shown in Table 9. After the CIR layer was placed, the entire project was overlaid with two inches of hot mix asphalt.

Nuclear density testing results are shown in Table 10. Nuclear density testing results on mixes with moisture typically only show trends and not true density values or true moisture contents. The roller pattern was 3 passes of a steel wheel followed by 13 passes of pneumatic tire rollers.

There was some raveling on the last sections completed on the first day and on the section completed using 1.9% by weight emulsion content. Raveling was minor and was a result of roller pickup and, in one section, low emulsion content. Roller pickup was due to the scrapers and water system on the rollers not working.

Trucks were on the mat at most three hours after milling with no signs of rutting.

TABLE 8

Existing pavement thickness and core data

| Core number | Location (station) | Depth (mm) | Comments |
|---|---|---|---|
| 1 | 743 + 520 | 100 | Mostly gravel mix with double seal |
| 2 | 744 + 090 | 87 | " |
| 3 | 744 + 510 | 87 | " |
| 4 | 745 + 134 | 100 | " |

TABLE 8-continued

Existing pavement thickness and core data

| Core number | Location (station) | Depth (mm) | Comments |
|---|---|---|---|
| 5 | 745 + 410 | 130 | Contained crushed layer with single seal |
| 6 | 745 + 740 | 125 | " |
| 7 | 746 + 400 | 113 | Mostly gravel mix with double seal |
| 8 | 746 + 670 | 100 | " |
| 9 | 746 + 970 | 113 | " |
| 10 | 747 + 210 | 125 | " |
| 11 | 747 + 810 | 119 | Contained crushed layer with single seal |
| 12 | 748 + 410 | 100 | " |
| 13 | 748 + 800 | 106 | Mostly gravel mix with double seal |
| 14 | 749 + 760 | 100 | " |
| 15 | 749 + 970 | 100 | " |
| 16 | 751 + 320 | 92 | " |

TABLE 9

Project history and emulsion contents

| Location | Comments | Emulsion content |
|---|---|---|
| STA 754 + 080 (~MM 468.5) | Where The CIR process of the present invention started on first day | 2.5% by weight |
| STA 753 + 630 | Area of pneumatic tire pickup - some raveling. Water on tires fixed. | 2.5% by weight |
| STA 752 + 400 | Emulsion content lowered | 2.15% by weight |
| STA 750 + 360 | CIR train down 1.5 hours - pump plugged | |
| STA 749 + 806 (~MM 466) | Slight raveled area going to STA 748 + 680 | |
| ~STA 749 + 760 | | 2.3% by weight |
| ~STA 749 + 310 | | 2.45% by weight |
| STA 748 + 680 | Station at end of first day | 2.3% by weight |
| STA 748 + 680 | Start of second day | 2.6% by weight |
| STA 746 + 340 (near MM 464) | High asphalt content in pavement and existing pavement flushed; minor raveling | 1.9% by weight |
| STA 745 + 620 | Mix appeared very rich - slowed paver down - much hand work | 1.9% by weight |
| STA 744 + 660 | | 2.2% by weight |
| STA 743 + 940 | | 2.7% by weight |
| STA 743 + 910 | | 3.0% by weight |
| STA 743 + 402 (MM 462) | End of project | 3.0% by weight |

TABLE 10

Nuclear testing results

| Location (station) | Density, pcf Design = 127.1 | Moisture, % by weight | Date construct | Comments |
|---|---|---|---|---|
| 753 + 630 | 122.2 | 4.7 | 5-24 | Raveled area/under-rolled |
| 753 + 600 | 122.9 | 5.0 | 5-24 | Raveled area/under-rolled |
| 753 + 300 | 116.2 | 4.8 | 5-24 | Roller problems |
| 752 + 700 | 125.3 | 5.2 | 5-24 | |
| 752 + 400 | 117.5 | 4.3 | 5-24 | |
| 752 + 100 | 121.0 | 3.5 | 5-24 | |
| 751 + 800 | 119.1 | 3.5 | 5-24 | |
| 751 + 500 | 119.5 | 4.2 | 5-24 | |
| 751 + 200 | 122.0 | 4.0 | 5-24 | |
| 750 + 900 | 126.1 | 4.6 | 5-24 | |
| 750 + 600 | 122.4 | 4.0 | 5-24 | |

TABLE 10-continued

Nuclear testing results

| Location (station) | Density, pcf Design = 127.1 | Moisture, % by weight | Date construct | Comments |
|---|---|---|---|---|
| 750 + 300 | 120.3 | 4.0 | 5-24 | |
| 750 + 000 | 119.5 | 4.0 | 5-24 | |
| 749 + 700 | 123.0 | 4.6 | 5-24 | |
| 749 + 400 | 120.5 | 4.5 | 5-24 | |
| 749 + 100 | 120.3 | 9.6 | 5-24 | |
| 748 + 800 | 121.3 | 9.8 | 5-24 | |
| 748 + 560 | 119.4 | 4.7 | 5-25 | |
| 748 + 260 | 120.9 | 3.8 | 5-25 | |
| 747 + 960 | 118.6 | 4.4 | 5-25 | |
| 747 + 540 | 121.1 | 4.1 | 5-25 | |
| 747 + 180 | 122.3 | 4.1 | 5-25 | |
| 746 + 940 | 122.9 | 4.0 | 5-25 | |
| 746 + 610 | 119.6 | 4.4 | 5-25 | |
| 746 + 220 | 119.7 | 4.0 | 5-25 | |
| 745 + 830 | 122.7 | 3.4 | 5-25 | |
| 745 + 560 | 125.1 | 4.3 | 5-25 | |
| 745 + 230 | 120.1 | 4.8 | 5-25 | |
| 745 + 830 | 122.7 | 3.4 | 5-25 | |
| 745 + 560 | 125.1 | 4.3 | 5-25 | |
| 745 + 230 | 120.1 | 4.8 | 5-25 | |
| 745 + 020 | 118.9 | 4.1 | 5-25 | |
| 744 + 720 | 120.5 | 3.4 | 5-25 | |
| 744 + 480 | 119.0 | 3.4 | 5-25 | |
| 744 + 120 | 119.3 | 4.2 | 5-25 | |
| 743 + 730 | 118.7 | 3.7 | 5-25 | |

Figure 3:
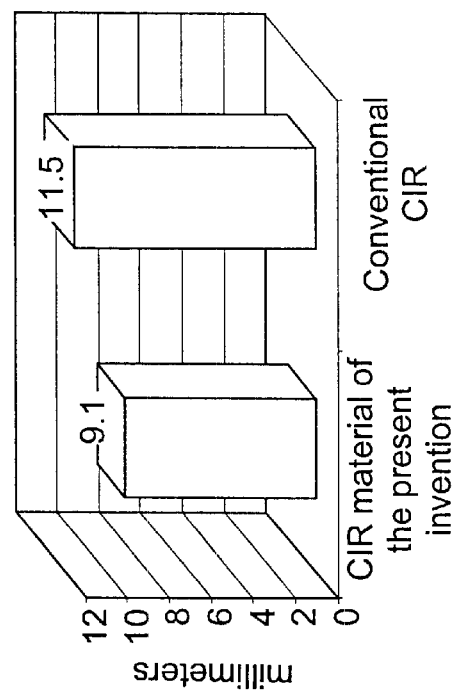
FIG. 3 is a graph comparing Asphalt Pavement Analyzer data at 50° C. for a specimen made in accordance with the present invention and a conventional specimen as discussed in Example 1.

After the project was completed, field cores were taken from the comparative project on US 191 in Arizona. These cores were tested under water in an Asphalt Pavement Analyzer (APA), which is a wheeltracking device. FIG. 3 shows the core of the CIR invented process rutted less than the conventional CIR, even though the core of the CIR invented process had a higher emulsion content. This behavior was also documented in the field. The conventional sections exhibited isolated rutting shortly after application, and the sections with the CIR material of the present invention did not.

EXAMPLE 2

A cold in-place recycling (CIR) design was completed for US-281 in South Dakota. The project was located at an elevation of approximately 1637 feet. Normal high and low temperatures and normal precipitation for the area are shown in Table 11.

TABLE 11

| | May | June | July | August | September |
|---|---|---|---|---|---|
| High temp., ° F. | 71 | 81 | 88 | 86 | 75 |
| Low temp., ° F. | 47 | 57 | 63 | 61 | 51 |
| Normal precipitation, in. | 3.6 | 3.4 | 2.8 | 2.3 | 1.9 |

Annual precipitation is 22.1 inches.

The FHWA LTPPBind™ (Version 2.1) program recommended a binder to withstand 64° C. (almost 58° C.) pavement temperatures for a surface mix (at 98% reliability). The low temperature grade was −34° C. (almost −28° C.).

Figure 4:
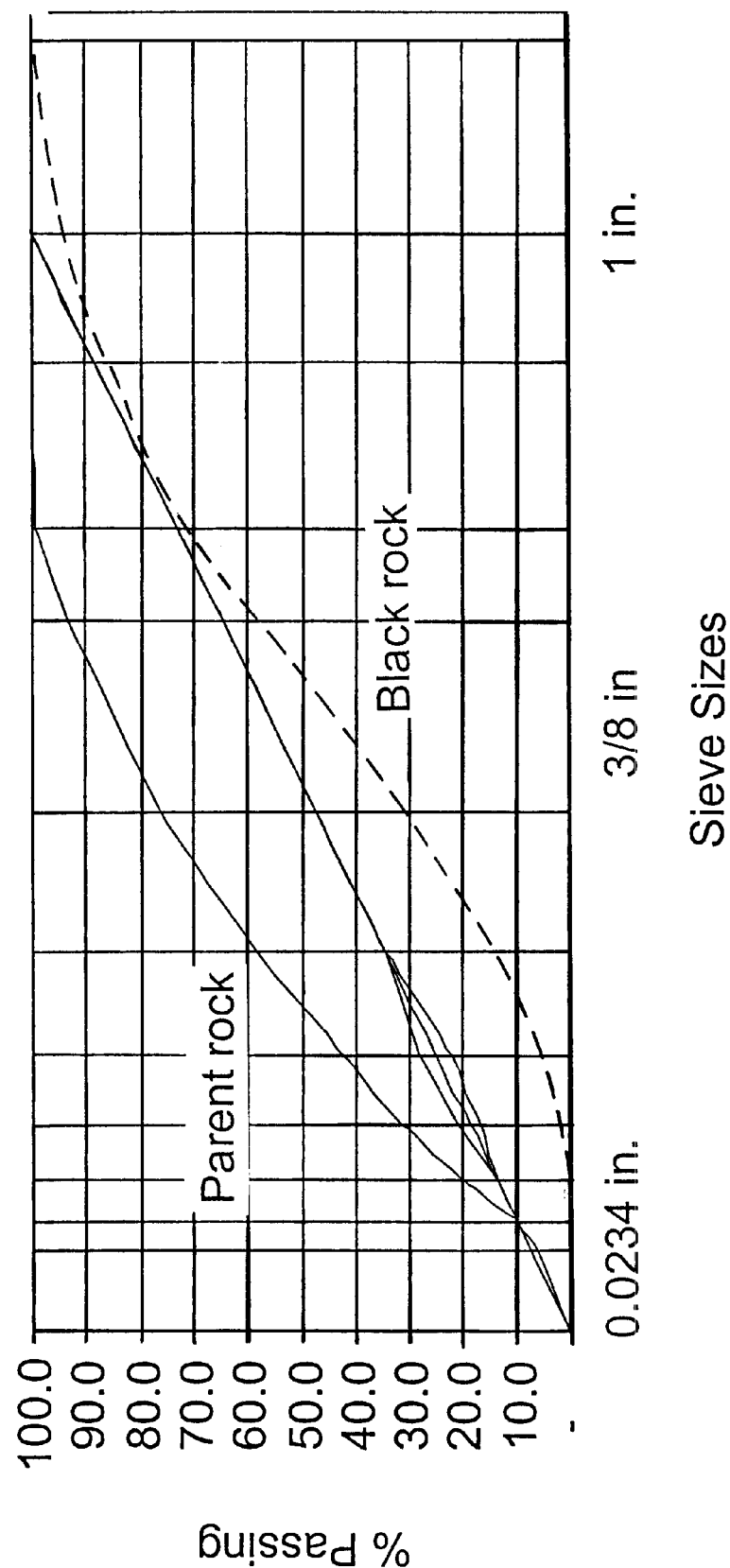
FIG. 4 is a is a graph showing sieve analysis of the RAP and rock used in the CIR process of the present invention as it was performed in Example 2.

CIR millings were obtained at the beginning of this project and evaluated in a laboratory. Mix designs were performed using the CIR method of the present invention. Oven ignition was performed on the millings, and they were found to have 8.0% by weight asphalt. The parent rock consisted of 42% by weight 2-crushed faces, 18% by weight 1-crushed face, and 40% by weight uncrushed material. The gradation of the parent rock is shown in FIG. 4.

Material above 1 inch in size was screened out before mixing. A mix design was performed with a Superpave™ gyratory compactor in a 100-mm mold to 30 gyrations. Short-term strength tests were performed comparing conventional CIR material and the CIR material made from the method of the present invention. Long-term cured specimens were tested for strength and retained strength after water saturation.

Specimens were made with 1.5% and 3.0% by weight emulsion. They were cured after compaction at 30° C. and 50% humidity to simulate a worst-case scenario for field curing. After 4 hours, specimens were tested for indirect tensile strength. There was a 30% increase in the early strength of the CIR material of the process of the present invention over conventional CIR.

Figure 5:
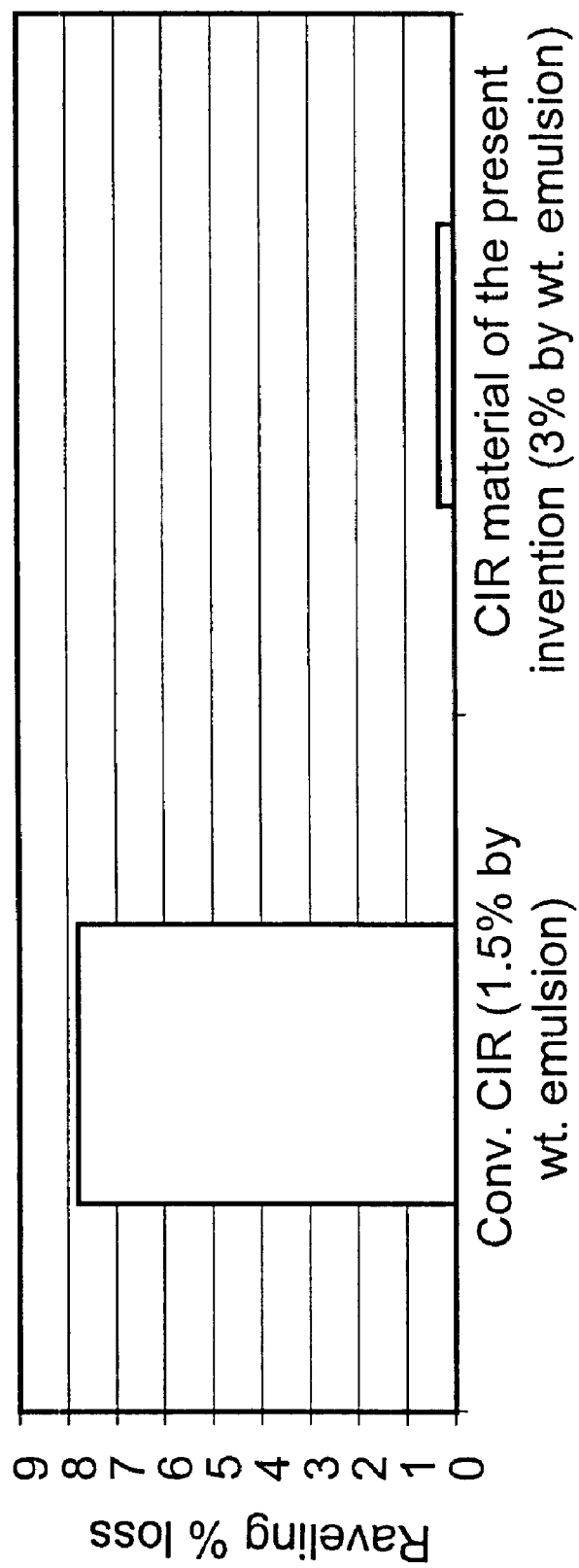
FIG. 5 is a graph showing the results of the raveling test performed in Example 2 in accordance with the present invention.

A raveling test was performed on the materials at the anticipated emulsion content from the mix design. Specimens were compacted to the approximate density achieved during the design. FIG. 5 shows the results of the raveling test. This data indicates that the CIR material obtained from the method of the present invention is much less likely to ravel under traffic than the conventional CIR material.

Specimens were made with two different emulsion contents for both conventional CIR and the CIR material of the process of the present invention and were cured after compaction to less than 0.5% moisture. After curing, half the specimens were tested dry and half the specimens were vacuum saturated with water and then soaked for 24 hours. The saturated data was for an indication of long-term durability (long-term strength). All specimens were tested at 40° C.

TABLE 12

Marshall stability and retained stability

| | Emulsion content, % by weight | Air Voids, % | Saturation % | Stability, lb | Retained stability, lb | Percent Retained |
|---|---|---|---|---|---|---|
| Conv. CIR material | 1.5 | 11.5 | 62 | 1674 | 958 | 57 |
| | 2.5 | 9.8 | 69 | 1276 | 841 | 66 |
| CIR material of the present invention | 2.5 | 10.2 | 67 | 1563 | 1227 | 78 |
| | 3.5 | 9.2 | 61 | 1490 | 946 | 64 |

Results from both CIR materials were good. The CIR material of the process of the present invention overall had a better percent retained stability. It also had slightly better stability values. Mixes made using the CIR process of the present invention had slightly better coating than conventional CIR material. The design was completed but the project was not done using the designed mix developed from the process of the present invention due to time constraints.

EXAMPLE 3

A cold in-place recycling (CIR) project was done in Blue Earth County, Minn., where the elevation was approximately 836 feet. Normal high and low temperatures and normal precipitation are shown in Table 13. Cores were taken and crushed in the laboratory in order to perform a mix design.

TABLE 13

|  | May | June | July | August | September |
|---|---|---|---|---|---|
| High temp., °F. | 71 | 81 | 85 | 82 | 73 |
| Low temp., °F. | 47 | 56 | 61 | 58 | 48 |
| Normal precipitation, in. | 3.3 | 3.8 | 4.0 | 3.9 | 3.1 |

Annual precipitation is 29.5 inches.

The FHWA LTPPBind™ (Version 2.1) program recommended a binder for the surface of Performance Grade (PG) 58-34 (at 98% reliability) and a binder of grade PG 58-28 at 92% reliability. A grade PG 58-40 binder was used in the Superpave™ surface mix.

Figure 6:
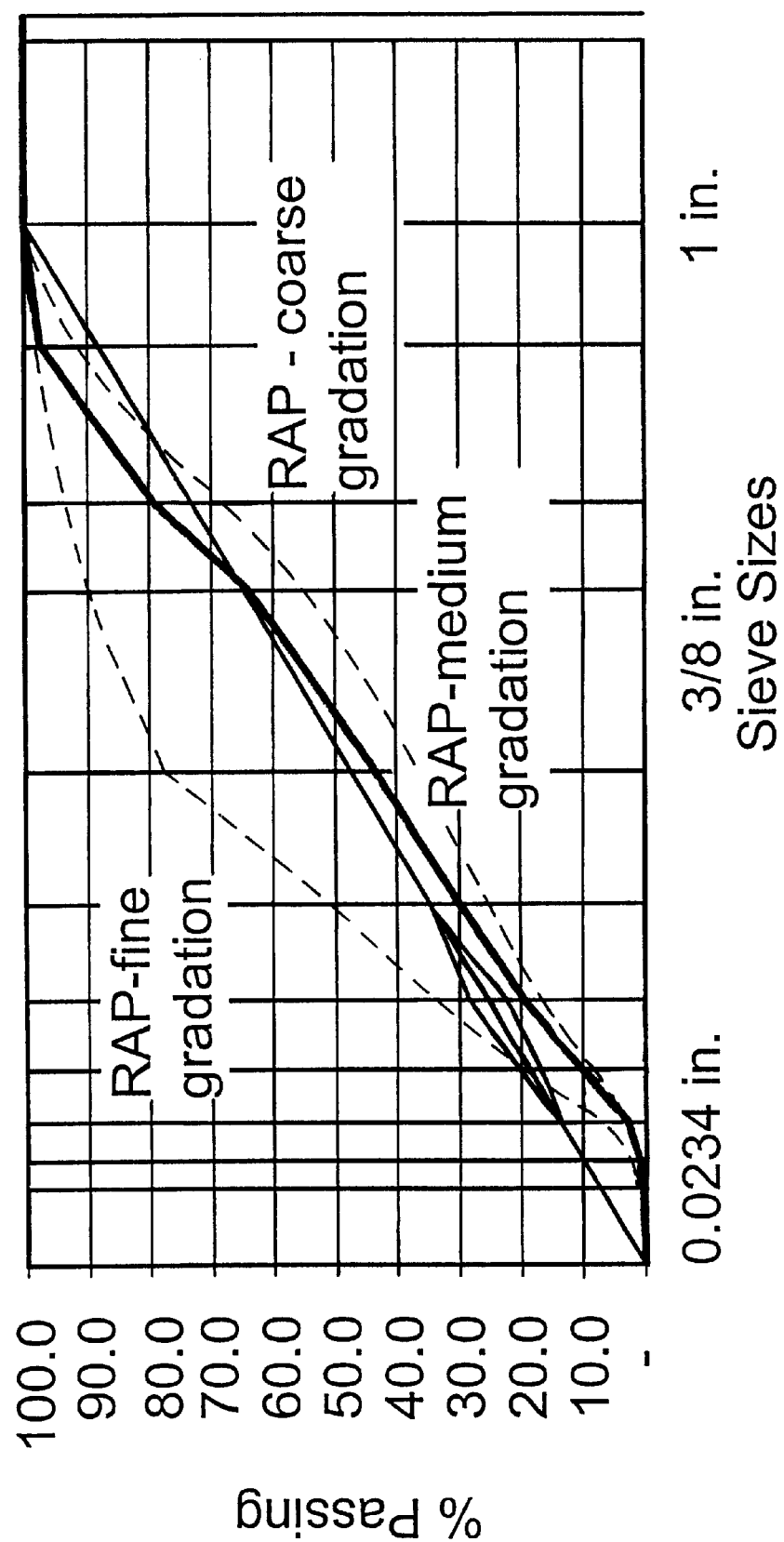
FIG. 6 is a graph showing sieve analysis of the RAP used in the CIR process of the present invention as it was performed in Example 3.

Cores were crushed, and different gradations were produced. Mix designs were performed using the process of the present invention with the different gradations of millings. Oven ignition was performed on the millings, and they were found to be 6.5% by weight asphalt. The gradation of the RAP millings is shown in FIG. 6.

Material above 1 inch in size was screened out before mixing. The mix design was performed with a Superpave™ gyratory compactor in a 100-mm mold to 30 gyrations. Cured specimens were tested for strength and retained strength after water saturation. A comparison was made to conventional CIR material with the medium gradation RAP. All specimens were tested at 40° C. See Table 14 for data.

A raveling test was performed using the medium gradation RAP comparing conventional CIR to CIR material made using the process of the present invention. An emulsion content of 1.5% by weight was used for the conventional CIR material and 3.0% by weight for the CIR process of the present invention. Specimens were compacted to near the same density achieved during design and allowed to cure at ambient laboratory conditions before testing. After 15 minutes of testing, the specimens made from the process of the present invention had 1.6% by weight loss. After 2.5 minutes of testing, the specimen made with conventional CIR material had 25.7% by weight loss.

TABLE 14

Marshall stability and retained stability

| | Emulsion content, % by weight | Air Voids, % | Saturation, % | Stability, lb | Retained stability, lb | Percent Retained |
|---|---|---|---|---|---|---|
| Conv. CIR | 1.3 | 14.3 | 65 | 2093 | 876 | 42 |
| Medium gradation CIR material of the present invention | 2.0 | 13.2 | 63 | 2112 | 1060 | 50 |
| | 2.0 | 11.9 | 76 | 1827 | 1428 | 78 |
| | 2.7 | 10.6 | 74 | 1824 | 1680 | 92 |
| | 3.4 | 9.1 | 80 | 1635 | 1361 | 83 |
| Medium gradation CIR material of the present invention Fine gradation | 2.0 | 13.4 | 72 | 2174 | 1439 | 66 |
| | 2.7 | 12.4 | 72 | 2025 | 1445 | 71 |
| | 3.4 | 11.6 | 69 | 1841 | 1484 | 81 |
| CIR material of the present invention Coarse gradation | 2.7 | 11.6 | | 1763 | | |
| | 3.4 | 10.4 | | 1624 | | |

Unconditioned stability values for conventional CIR specimens were higher than the CIR specimens of the process of the present invention. Although saturation levels were higher for the CIR specimens of the process of the present invention, they had better retained stability values and retained percent values.

The fine and coarse gradations indicated no problems in short-term or long-term performance. The recommended starting emulsion contents were Medium gradation: 2.9±0.25%, Fine gradation: 3.2±0.25%, and Coarse gradation: 3.0±0.25%. Tolerances of ±0.25% were allowed based on coating and other visual factors observed in the field.

The following was the equipment used with the conventional train: milling machine approximately 12.5 feet wide; screening, crushing, and pugmill including shaker; 6,000 gallon tanker; pick-up device; paver with tracks; and screed (12 feet) with strike-off plate in front of extensions.

Gradation was checked in the field on the first, second, and fourth days of production with the conventional train/paver process and the CIR material of the invented process. In order to obtain a quicker result, the material was not fully dried but was aerated before testing. The results are shown in Table 15.

TABLE 15

Gradation results from Blue Earth County Samples

| | Day 1 a.m. On-Site | Day 2 10:30 On-site | Day 2 3:00 On-site | Day 4 7:45 In lab | Day 4 11:30 In lab | Fine Mix Design | Med. Mix Design | Coarse Mix Design |
|---|---|---|---|---|---|---|---|---|
| 1.5 in. | 100 | 100 | 100 | 100 | 100 | | | |
| 1 in. | 100 | 100 | 100 | 100 | 100 | | 100 | 100 |
| ¾ in. | 92 | 97 | 98 | 96 | 97 | 99 | 98 | 93 |
| ½ in. | 70 | 84 | 88 | 79 | 78 | 94 | 79 | 68 |
| ⅜ in. | 56 | 75 | 78 | 67 | 64 | 90 | 64 | 55 |
| No. 4 | 31 | 52 | 52 | 42 | 37 | 78 | 43 | 37 |
| No. 8 | 19 | 35 | 34 | 25 | 20 | 51 | 30 | 26 |
| No. 30 | 5.1 | 10.7 | 9.1 | 8.0 | 5.6 | 20 | 10.2 | 8.6 |
| $H_2O$, % by weight | — | — | — | 2.8 | 1.7 | | | |

TABLE 15-continued

Gradation results from Blue Earth County Samples

|  | Day 1 a.m. On-Site | Day 2 10:30 On-site | Day 2 3:00 On-site | Day 4 7:45 In lab | Day 4 11:30 In lab | Fine Mix Design | Med. Mix Design | Coarse Mix Design |
|---|---|---|---|---|---|---|---|---|
| Approx. graduation | Milled once. Coarse | Milled twice. Med.-fine | Milled twice. Med.-fine | Milled once. Medium | Milled once. Med.-coarse |  |  |  |

The three mix designs were chosen that bracketed the gradation in the field. The "milled twice" comment was for millings that were in front of the milling machine when parts of the road were corrected (geometries, etc.), and it was not known if these millings were similar in nature to the rest of the road.

The average emulsion content was estimated to be 3.25% by weight. This was estimated from approximately 4,738 tons of RAP (approximate after moisture correction) and 154 tons of CIR material of the invented process. On the cold in-place recycled surface of the present invention, four surface treatments were applied on various sections of the road, a two inch Superpave™ overlay (one mile), fog seal (0.25 mile), chip seal (0.25 mile), and double chip seal (0.25 mile).

Figure 7:
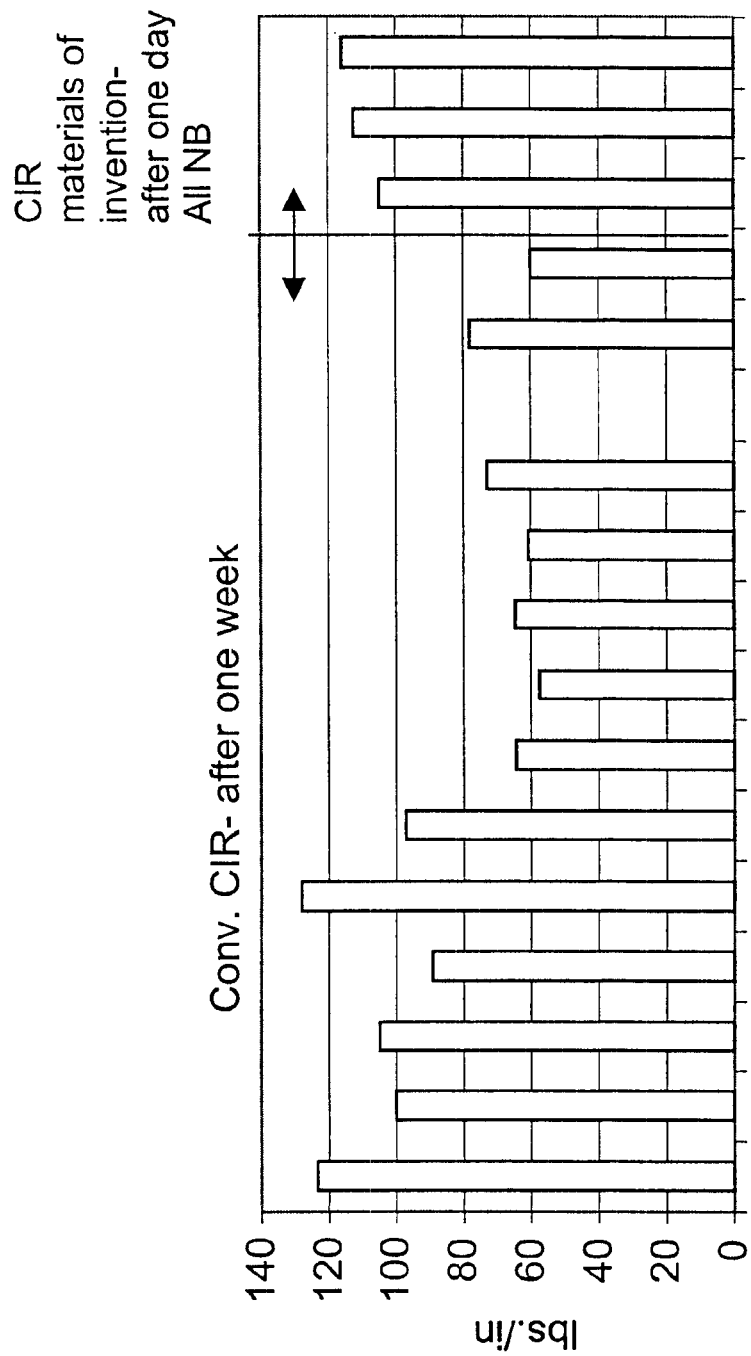
FIG. 7 is a graph showing stiffness measurements at various stations on the road as measured in Example 3 in accordance with the present invention.

After the project was complete, a new testing device was also used on the project in Blue Earth County, Minn. Pavement strength was determined using a Humbolt Stiffness Gauge. This hand portable instrument imparts a very small displacement to the newly recycled pavement at 25 steady state frequencies between 100 and 196 Hz. Stiffness was determined at each frequency, and the average was displayed. At the low frequencies used, the impedance at the surface was stiffness controlled and proportional to the shear modulus of the recycled material. Stiffness was measured with a Humboldt stiffness gauge on the CIR material of the invented process and the conventional CIR. The stiffness values of CIR material of the invented process after one day were higher than the values of the conventional CIR material after one week. See FIG. 7.

EXAMPLE 4

A cold in-place recycling (CIR) project was done in Whitman County, Wash. Cores were taken and crushed in the laboratory in order to perform mix designs. This project demonstrated differences between conventional CIR material and the CIR material of the process of the present invention. The elevation was approximately 2545 feet. Normal high and low temperatures and normal precipitation are shown in Table 16.

TABLE 16

|  | May | June | July | August | September |
|---|---|---|---|---|---|
| High temp., ° F. | 64 | 72 | 81 | 82 | 72 |
| Low temp., ° F. | 41 | 47 | 50 | 50 | 44 |
| Normal precipitation, in. | 1.6 | 1.4 | 0.7 | 0.9 | 1.0 |

Annual precipitation is 21.1 inches.

The FHWA LTPPBind™ (Version 2.1) program recommended a binder for the surface of grade PG 58-28 (at 98% reliability). A grade PG 64-28 binder was used in the surface mix.

Figure 8:
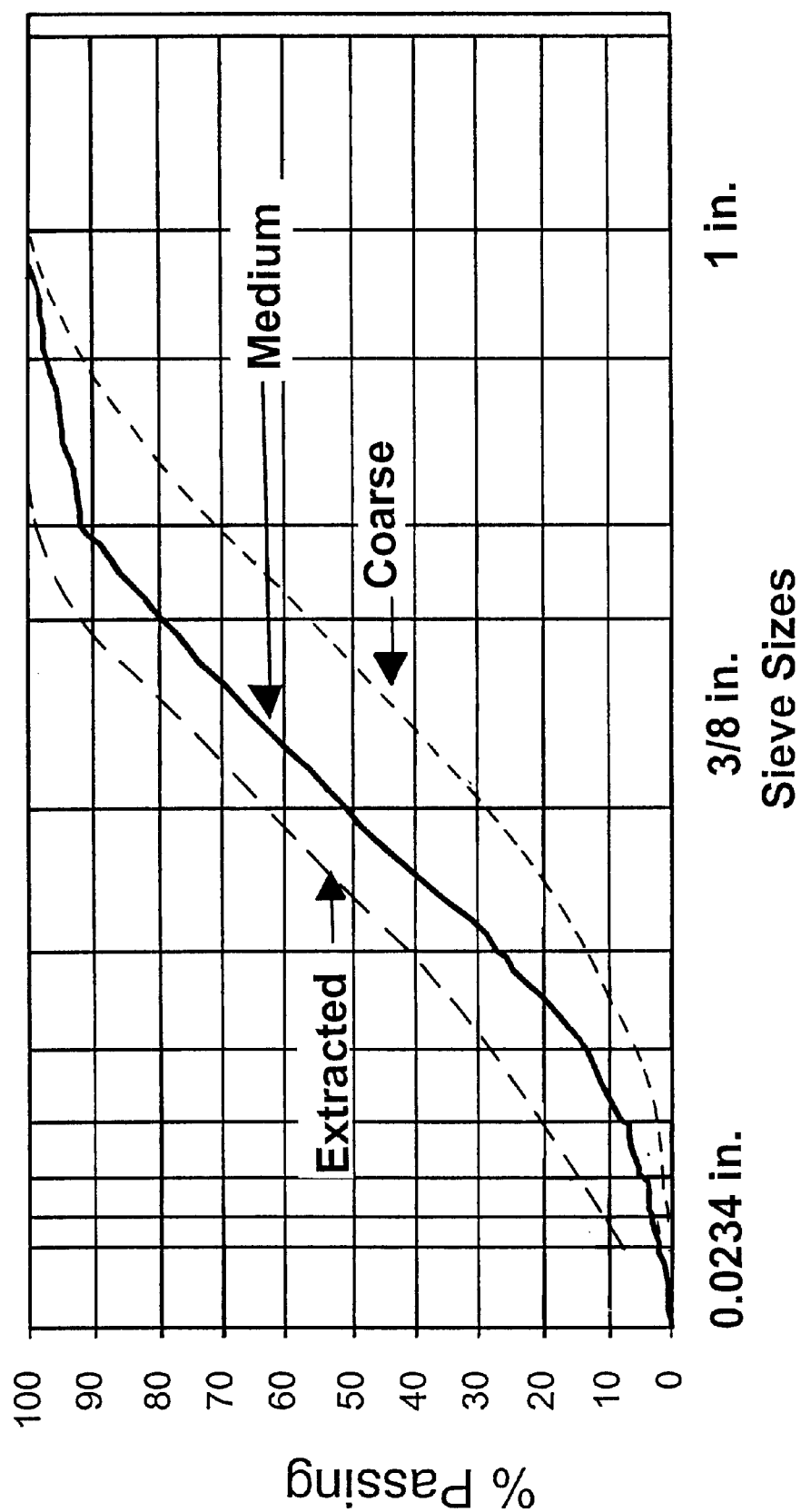
FIG. 8 is a graph showing sieve analysis of the RAP and rock used in the CIR process of the present invention as it was performed in Example 4.

Cores were obtained in the area to be recycled and sent to a laboratory for evaluation. Cores were crushed, and different gradations were produced to anticipate gradations of the millings during the project. A fine millings gradation was not evaluated due to the excessive crushing in the lab that was necessary to obtain the medium and coarse gradations. The excessive crushing indicated that a fine gradation was probably not obtainable using typical cold in-place recycling milling equipment. Mix designs were performed with the CIR material created by the process of the present invention using the different gradations of millings. Oven ignition was performed on the millings, and they were found to have 6.7% by weight asphalt. All rock examined after oven ignition was observed to be angular. The gradation of the RAP millings is shown in FIG. 8.

There was debonding between many of the layers, which could show up as fatigue cracking on the pavement surface. No visual stripping was observed. A stripping test, AASHTO T283, was performed on four cores to determine if stripping was present or if the mixes had the potential to strip. After saturating the specimen voids with water to 75%, freezing for 30 hours, submerging the specimens for 23 hours at 60° C., and testing at 25° C., the indirect tensile strength ratio was 63%. A Superpave™ mix design requires 70 or 80% retained strength on freshly prepared hot mix specimens. No visual stripping was observed in the conditioned specimens. This testing indicated that stripping was currently not occurring.

Material above 1 inch in size was screened out before mixing. A design was performed with a Superpave™ gyratory compactor in a 100-mm mold to 30 gyrations. Long-term cured specimens were tested for strength and retained strength after water saturation. A comparison was made to conventional CIR material with lime using the medium gradation. The CIR material of the present invention (2.7% by weight emulsion) with lime was also compared to the CIR material of the present invention with no lime. Lime was added as a slurry, and the lime solids content was 1.5% by weight.

A raveling test was performed using the medium gradation comparing conventional CIR (with lime) to the CIR material created by the process of the present invention. Specimens were compacted to about the same density achieved during design and allowed to cure for four hours at ambient laboratory conditions before testing. The loss of conventional CIR material was 16% by weight after 4 minutes. The loss of the CIR material created by the process of the present invention was 1.5% by weight after 15 minutes.

Specimens were made with different emulsion contents for each gradation type and were cured after compaction to less than 0.5% moisture. The medium gradation was used for conventional and invented CIR materials. Coarse gradation specimens with and without lime were also tested.

After curing, a moisture susceptibility vacuum saturation test using Marshall stability was performed on specimens that were vacuum saturated with water and then soaked for 24 hours. The saturated data was an indication of long-term durability. Hveem stability at 40° C. was measured for dry strength. All specimens were tested at 40° C. See Table 17 for data.

TABLE 17

| | Emulsion content, % by weight | Air Voids, % | Saturation, % | Hveem Stability | Dry Marshall Stability, lb | Retained stability, lb | Percent Retained |
|---|---|---|---|---|---|---|---|
| Conv. CIR/lime | 1.0 | 17.1 | 67 | 13.0 | 2016 | 1825 | 91 |
| Medium Gradation | 1.7 | 16.5 | 68 | 12.5 | 2570 | 1945 | 76 |
| | 2.4 | 15.1 | 68 | 10.7 | 2473 | 2103 | 85 |
| CIR material of the present invention Medium Gradation | 2.0 | 16.5 | 62 | 11.9 | 2507 | 1909 | 76 |
| | 2.7 | 14.9 | 62 | 11.5 | 2090 | 1933 | 92 |
| | 3.4 | 14.0 | 65 | 11.0 | 1691 | 2156 | 128 |
| CIR material of the present invention Coarse gradation | 2.0 | 14.2 | 65 | 12.5 | 2167 | 1783 | 82 |
| | 2.7 | 13.9 | 68 | 11.5 | 2607 | 1811 | 69 |
| | 3.4 | 13.4 | 70 | 11.1 | 2237 | 1588 | 71 |
| CIR material of the present invention/lime Coarse Gradation | 2.7 | 13.5 | 61 | 8.8 | 2193 | 2021 | 92 |

The coating of the CIR material of the process of the present invention was superior to the coating of the conventional CIR with lime specimens. The specimens of the CIR process of the present invention had slightly better retained strength values after moisture conditioning.

The coarse gradation strength and volumetric measurements indicated no significant differences from the medium gradation samples.

The recommended starting emulsion contents for the CIR material of the process of the present invention were medium gradation of 3.0 to 3.4% and coarse gradation of 3.0 to 3.4%. These numbers depend on the gradation produced by milling, crushing, and screening. Tolerances of 0.25% were allowed based on coating and other visual factors observed in the field.

Long-term strength values, as measured by Marshall stability and Hveem stability on specimens cured to less than 0.5% moisture, were comparable between conventional CIR and CIR specimens made by the process of the present invention. Retained stability values after water saturation were slightly higher for the CIR specimens of the process of the present invention. The improved coating in the CIR specimens of the process of the present invention was a factor in the higher retained stability values, which are an indicator of long-term durability.

The gradations from the RAP in Washington are listed in Table 18. These gradations fit into the range of those for the mixture testing done in the project design.

Figure 9:
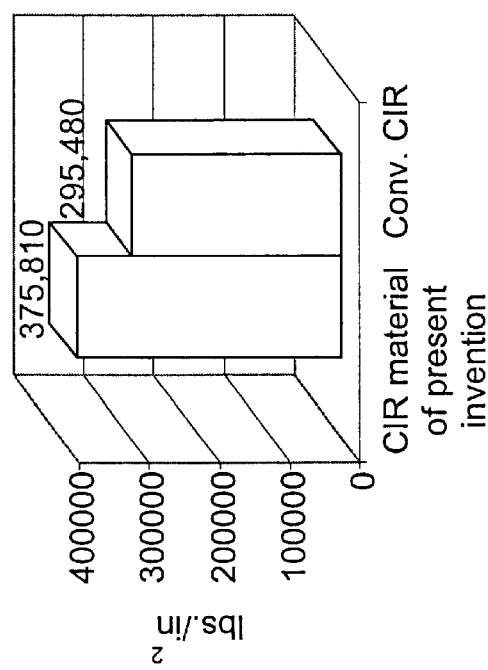
FIG. 9 is a graph comparing the Resilient Modulus at 25° C. of a specimen made in accordance with the present invention and a conventional specimen as discussed in Example 4.

Recycled mixes were taken from the field project on Washington State US 270. These mixes were compacted in the laboratory and tested for resilient modulus. FIG. 9 shows a much higher modulus for the CIR material of the process of the present invention than for the conventional mixture.

Resilient Modulus specimens were made from the project millings and emulsion samples in the laboratory on the Superpave™ gyratory compactor. The Resilient Modulus testing was completed by the laboratory, and the summary of the results can be seen in Table 19. The voids were also tabulated for these specimens in Table 19 and are close to those tested for the original mix design. The more detailed test results for the Resilient Modulus are shown in Tables 20 and 21 for the CIR material of the process of the present invention and conventional CIR, respectively.

Indirect tensile specimens for thermal cracking were made from the project millings and emulsion samples in the laboratory. FIG. 10 shows the IDT graphical results of this testing for the CIR material with 3% by weight emulsion made by the process of the present invention. The conventional CIR specimens were not consistent enough to analyze. The results predicted an initiation of thermal cracking at −26° C. for the CIR material made by the present invention.

TABLE 18

Field Gradation Results

| Agg type Percent used | 11:30 a.m. Milling no lime | Millings with lime |
|---|---|---|
| 1¼ IN* | 98.5 | 98.6 |
| 1 IN | 94.9 | 96.9 |
| ¾ IN | 82.5 | 83.8 |
| ½ IN | 72.3 | 71.5 |
| ⅜ IN | 61.8 | 58.5 |
| #4 | 33.0 | 32.8 |
| #8 | 18.4 | 18.1 |
| #10 | 18.4 | 18.1 |
| #16 | 10.4 | 10.4 |
| #30 | 6.9 | 6.9 |
| #40 | 6.9 | 6.9 |
| #50 | 4.9 | 4.8 |
| #80 | 4.9 | 4.8 |
| #100 | 3.5 | 3.4 |
| #200 | 2.6 | 2.5 |
| % MOISTURE | 2.64 | 2.49 |

TABLE 19

Resilient Modulus Summary and Air Void Data

| Emulsion | The CIR process of the present invention | CMS/Lime |
|---|---|---|
| Resilient Modulus Results, $M_R$ @ 25° C. | 375816 | 295480 |

The samples were cured at 60° C. for 48 hours. The testing was completed within one week and the samples were at ambient conditions during that time.

TABLE 20

Resilient Modulus Data - 3% by weight The CIR process of the present invention Emulsion (no lime slurry)

| Test # | Material | Date | Axis | Thickness of Core | Load in Pounds | Delta in micro-inches | Resilient Modulus |
|---|---|---|---|---|---|---|---|
| 1 | Invented process specimen | 11/15/00 | 1 | 2.34 | 100 | 61 | 436738 |
| 2 | | | 2 | | | 68 | 391780 |
| 3 | | | 1 | | | 82 | 324891 |
| | | | | | | | 358335 |
| 1 | Invented process specimen | 11/15/00 | 1 | 2.3 | 100 | 74 | 366275 |
| 2 | | | 2 | | | 68 | 398593 |
| 3 | | | 1 | | | 58 | 467316 |
| | | | | | | | 432955 |
| 1 | Invented process specimen | 11/15/00 | 1 | 2.32 | 100 | 67 | 401055 |
| 2 | | | 2 | | | 79 | 340135 |
| 3 | | | 1 | | | 74 | 363117 |
| | | | | | | | 351626 |
| AVERAGE | | | | | | | |
| 1 | | 11/15/00 | 1 | 2.32 | 100 | 67.3 | 399070 |
| 2 | | | 2 | | | 71.7 | 374940 |
| 3 | | | 1 | | | 71.3 | 376692 |
| | | | | | | Avg. of 2 & 3 | 375816 |

TABLE 21

Resilient Modulus Data - 2% Conventional CIR Material (lime slurry)

| Test # | Material | Date | Axis | Thickness of Core | Load in Pounds | Delta in micro-inches | Resilient Modulus |
|---|---|---|---|---|---|---|---|
| 1 | Conv. CIR | 11/15/00 | 1 | 2.31 | 100 | 105 | 257019 |
| 2 | | | 2 | | | 97 | 278217 |
| 3 | | | 1 | | | 104 | 259491 |
| | | | | | | | 268854 |

TABLE 21-continued

Resilient Modulus Data - 2% Conventional CIR Material (lime slurry)

| 1 | Conv. CIR | 11/15/00 | 1 | 2.29 | 100 | 96 | 283570 |
|---|---|---|---|---|---|---|---|
| 2 | | | 2 | | | 93 | 292717 |
| 3 | | | 1 | | | 114 | 238796 |
| | | | | | | | 265756 |
| 1 | Conv. CIR | 11/15/00 | 1 | 2.25 | 100 | 77 | 359827 |
| 2 | | | 2 | | | 78 | 355214 |
| 3 | | | 1 | | | 78 | 355214 |
| | | | | | | | 351626 |
| AVERAGE | | | | | | | |
| 1 | | 11/15/00 | 1 | 2.28 | 100 | 92.7 | 298993 |
| 2 | | | 2 | | | 89.3 | 310149 |
| 3 | | | 1 | | | 98.7 | 280811 |
| | | | | | | Avg. of 2 & 3 | 295480 |

A COMPARISON OF EXAMPLES 1–4

Materials from four different projects were tested with both conventional CIR and the CIR specimens created by the designs of the present invention. Table 22 shows Marshall stabilities that are roughly equivalent for both the invented recycled mixes and the conventional systems used on the field projects. After soaking, the CIR specimens of the process of the present invention have higher retained stabilities than the conventional mixes.

TABLE 22

Marshall Stability Data (40° C.)

| | Arizona US 191 | | Minnesota Blue Earth County | | South Dakota | | Washington SR 270 | |
|---|---|---|---|---|---|---|---|---|
| Type of Emulsion | CIR of process of the present inv. | Conventional | CIR of process of the present inv. | Conventional | CIR of process of the present inv. | Conventional | The CIR process of the present inv. | Conventional |
| Stability (dry), lbs | 1750 | 1860 | 1730 | 2100 | 1530 | 1470 | 1890 | 2520 |
| Stability (soaked) lbs. | 990 | 690 | 1520 | 970 | 1090 | 900 | 2040 | 2250 |

From the foregoing, it will be seen that this invention is one well adapted to attain all the ends and objects herein above set forth together with other advantages which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying figures is to be interpreted as illustrative and not in a limiting sense.

We claim:

1. A method of reconstructing a paved road, comprising:

taking cores of said road;

visually inspecting said cores to determine composition of layers in said cores, the thickness of said layers, and variations between cores;

crushing said cores to form recycled asphalt pavement particles;

selecting a substantially solvent-free emulsion based on climate history of said paved road and application temperature of said emulsion;

mixing said emulsion and said reclaimed asphalt pavement particles to form an asphalt emulsion mixture; and testing said asphalt emulsion mixture for performance using a raveling test, a thermal cracking test, a moisture susceptibility vacuum saturation test, and a stability test.

2. The method of claim 1, further comprising:

milling pavement off said road to form reclaimed asphalt pavement particles and leaving at least about an inch of said pavement on said road;

mixing said reclaimed asphalt pavement particles with said emulsion to form a cold in-place recycling layer; and applying said cold in-place recycling layer to said road.

3. The method of claim 2, further comprising:

compressing said CIR layer with a roller, wherein said roller may be placed on said CIR layer up to about an hour after said layer is applied.

4. The method claim 1, further comprising:

evaluating said road before taking cores of said road.

5. The method of claim 4, wherein said evaluation includes inspecting said road to determine if said road is thick enough to leave at least about an inch base of pavement after milling, determining if said road has a structurally sound base, and determining if said road has good drainage.

6. The method of claim 3, further comprising:

applying a wearing surface selected from the group consisting of a cold, hot, or warm mix overlay, a sealcoat, a chip seal, a fog seal, or other surface treatment.

7. The method of claim 1, wherein said cores are representative of variations in the road.

8. The method of claim 7, wherein at least two asphalt emulsion mixes are formulated for at least two different parts of the road having different compositions.

9. The method of claim 1, wherein said emulsion is comprised of emulsifier, asphalt solids, and water.

10. The method of claim 1, wherein said mixture is further comprised of lime, rock, polymer, elastomers, plastomers, other adhesion agents, and petroleum fractions or combinations thereof.

11. The method of claim 9, wherein said emulsion is solventless.

12. The method of claim 9, wherein said emulsifier is cationic.

13. The method of claim 2, wherein said CIR layer is able to support traffic.

14. The method of claim 3, wherein said roller rolls no more than about 30 minutes behind the paver.

15. The method of claim 2, wherein said method can be performed at temperatures of at least about 50° F.

16. The method claim 1, wherein said asphalt emulsion mixture ravels no more than about 2% by weight after curing for at least about 4 hours, a critical cracking temperature that is at least as low as the possible coldest temperature of said road with 98% reliability, and said asphalt emulsion mixture has a retained strength of at least about 70%.

17. The method of claim 2, wherein about 100% of said reclaimed asphalt pavement particles are able to pass through a 1.25 inch sieve.

18. The product of the process of claim 2.
19. The product of the process of claim 3.
20. The product of the process of claim 6.
21. The method of claim 1, wherein said asphalt emulsion mixture ravels no more than about 2% by weight after curing for at least about 4 hours.
22. The method of claim 1, wherein said asphalt emulsion mixture has a critical cracking temperature that is at least as low as the possible coldest temperature of said road with 98% reliability.
23. The method of claim 1, wherein said asphalt emulsion mixture has a retained strength of at least about 70%.
24. A method of reconstructing a paved road, comprising:

evaluating said road by inspecting said road to determine if said road is thick enough to leave at least about an inch base of pavement after milling, determining if said road has a structurally sound base, and determining if said road has good drainage;

taking cores of said road;

visually inspecting said cores to determine composition of layers in said cores, the thickness of said layers, and variations between cores;

crushing said cores to form recycled asphalt pavement particles;

selecting a substantially solvent-free emulsion based on climate history of said paved road and application temperature of said emulsion;

mixing said emulsion and said reclaimed asphalt pavement particles to form an asphalt emulsion mixture;

testing said asphalt emulsion mixture for performance using a raveling test, a thermal cracking test, a moisture susceptibility vacuum saturation test, and a stability test;

milling pavement off said road to form reclaimed asphalt pavement particles and leaving at least about an inch of said pavement on said road;

mixing said reclaimed asphalt pavement particles with said emulsion to form a cold in-place recycling layer;

applying said cold in-place recycling layer to said road;

compressing said CIR layer with a roller, wherein said roller may compress said CIR layer up to about an hour after said layer is applied; and applying a wearing surface selected from the group consisting of a cold, hot, or warm mix overlay, a sealcoat, a chip seal, a fog seal, or other surface treatment.

25. The product of the process of claim 24.

* * * * *

UNITED STATES PATENT AND TRADEMARK OFFICE
CERTIFICATE OF CORRECTION

PATENT NO. : 6,599,057 B2
DATED : July 29, 2003
INVENTOR(S) : Todd Thomas and Arlis Kadrmas It is certified that error appears in the above-identified patent and that said Letters Patent is hereby corrected as shown below:

<u>Title page,</u>
Item [57], ABSTRACT,
Line 1, delete "A method of reconstructing includes taking representative" and insert -- A method of reconstructing a road is provided. This method includes taking representative -- therefor.

<u>Column 3,</u>
Line 39, Table 1, delete "0.0020" and insert -- 0.0029 -- therefor.

<u>Column 5,</u>
Line 5, delete "emulsion." and insert -- of the mixture. -- therefor.

<u>Column 8,</u>
Line 19, delete "tZest)*100." and insert -- test) * 100. -- therefor.

Signed and Sealed this

Twenty-ninth Day of November, 2005

JON W. DUDAS
*Director of the United States Patent and Trademark Office*